United States Patent
Sowell et al.

(10) Patent No.: US 11,861,496 B2
(45) Date of Patent: Jan. 2, 2024

(54) AUTONOMOUS INTELLIGENT DECISION SUPPORT SYSTEM AND SERVER

(71) Applicant: AVEVA Software, LLC, Lake Forest, CA (US)

(72) Inventors: Tim Sowell, Lake Forest, CA (US); Colm McCarthy, Cambridge (GB)

(73) Assignee: AVEVA Software, LLC, Lake Forest, CA (US)

( * ) Notice: Subject to any disclaimer, the term of this patent is extended or adjusted under 35 U.S.C. 154(b) by 180 days.

(21) Appl. No.: 17/247,283

(22) Filed: Dec. 7, 2020

(65) Prior Publication Data
US 2021/0174077 A1 Jun. 10, 2021

Related U.S. Application Data

(60) Provisional application No. 62/944,638, filed on Dec. 6, 2019.

(51) Int. Cl.
| | |
|---|---|
| *G06N 20/00* | (2019.01) |
| *G06V 30/422* | (2022.01) |
| *G06N 3/08* | (2023.01) |
| *G06F 18/214* | (2023.01) |
| *G06V 10/82* | (2022.01) |
| *G06V 30/10* | (2022.01) |
| *G06V 30/18* | (2022.01) |

(52) U.S. Cl.
CPC ............ *G06N 3/08* (2013.01); *G06F 18/214* (2023.01); *G06N 20/00* (2019.01); *G06V 10/82* (2022.01); *G06V 30/422* (2022.01); *G06V 30/10* (2022.01); *G06V 30/18029* (2022.01)

(58) Field of Classification Search
None
See application file for complete search history.

(56) References Cited

U.S. PATENT DOCUMENTS

| | | | |
|---|---|---|---|
| 2016/0161930 A1* | 6/2016 | Jirkovský | G05B 19/4188 700/29 |
| 2017/0061031 A1 | 3/2017 | Jammikunta et al. | |
| 2017/0228589 A1 | 8/2017 | Parapurath et al. | |
| 2019/0236252 A1 | 8/2019 | Maeda et al. | |
| 2019/0236352 A1* | 8/2019 | Duke | G06V 10/82 |

FOREIGN PATENT DOCUMENTS

EP  1876553 A1  1/2008

OTHER PUBLICATIONS

International Search Report and Written Opinion for International PCT Application No. PCT/US2020/070872, dated Apr. 5, 2021, 10 pages, dated Apr. 5, 2021.

* cited by examiner

*Primary Examiner* — Dov Popovici
(74) *Attorney, Agent, or Firm* — Greenberg Traurig, LLP

(57) ABSTRACT

A system that includes artificial intelligence (AI) configured to identify text and images within an industrial reference. Example industrial references include electrical drawings and P&IDs. The system includes a method for training artificial intelligence model to recognize text characters and strings in addition to industrial images using a limited sample set. The use of a limited sample set improves computer performance by relying on a smaller dataset to train the model.

18 Claims, 14 Drawing Sheets

The Horizontal Ball Valve: Class HBV

The Vertical Ball Valve: Class VBV

AUTONOMOUS INTELLIGENT DECISION SUPPORT SYSTEM AND SERVER

CROSS-REFERENCE TO RELATED APPLICATION

This application claims the benefit of priority from U.S. Provisional Application No. 62/944,638, filed Dec. 6, 2019, entitled "Autonomous Intelligent Decision Support System and Server," which is incorporated herein by reference in its entirety.

BACKGROUND

Not all industrial environments have completely been immersed in the digital age. For many factories, most of the information about the various systems are contained in scanned PDF documents or in some cases books on a shelf. The arduous task of converting these documents to a searchable digital format is time consuming and requires multiple personnel.

Even in industrial settings where paper documents have been scanned and converted to a searchable PDF, the scope of what can be searched is limited to text against a standard clean background. When images and text are combined in the same area, or the text is rotated at some angle other than horizontal, even the best conventional text recognition software often fails to recognize even the most common text shape.

To compound this issue, currently there is no effective software implemented solution to recognized specific symbols and or images representing industrial hardware such as piping, ball valves, pumps, and the like.

A common example of an industrial process reference that contains a mixture of text oriented other than horizontal and images representing industrial software is a Piping and Instrumentation Diagram (P&ID). Therefore, there is a need for a system configured to recognize text and images within industrial references and transfer those text and images into a digital setting where they can be easily manipulated.

SUMMARY

Some embodiments of the Autonomous Intelligent Decision Support System and Server (hereafter "the system") are configured\to recognize text and images within industrial references and store those text and images into a database (e.g., a historian database).

In some embodiments, the system is configured to enable users to convert, store, search, retrieve, and/or display industrial references. In some embodiments, industrial references include, but are not limited to: piping and instrumentation diagrams (P&ID), electrical plans, power plant diagrams, electronic circuit diagrams, block diagrams, logic diagrams, HVAC diagrams, process flows, welding and wiring diagrams, flow charts, class diagrams, and/or state transition and timing diagrams. In some embodiments, industrial references include business references. In some embodiments, business references examples include, without limitation: business flow diagrams, audit reports, work flow diagrams, and/or any type of chart. In some embodiments, industrial references include structural references. In some embodiments, structural references examples include, without limitation: construction diagrams, such as floor plans, site plans, structural, and/or plumbing drawings. In some embodiments, industrial references are oil references. In some embodiments, oil reference examples include, without limitation, oil and gas reference, such as anticline, channel sands, fault trap, frac imaging, and the like. In some embodiments, industrial references include any labeled image from one or more of a factory, manufacturing, and process environment. In some embodiments, the system is configured to distinguish between text characters (e.g., letters, numbers, text, and language symbols) and images (e.g., industrial drawing symbols and/or pictures other than letters, numbers, text, and language symbols).

Some embodiments of the system include a computer implement method to train Artificial Intelligence (AI, which as used herein includes any type of machine learning) to recognize any combination of images and text within one or more industrial reference and convert each industrial reference into a computer searchable reference. Some embodiments of the system include at least a portion of one or more computer that include one or more processors and one or more non-transitory computer readable media with instructions stored thereon for implementing the at least a portion of each the embodiments described herein. In some embodiments, the non-transitory computer readable media includes instructions to implement the method to train AI to recognize any combination of images and text (as used herein, "text" includes any single or combination of one or more characters including letters, numbers linguistic symbols, and/or words) within one or more industrial references and convert each industrial reference into a computer searchable reference.

In some embodiments, the system is configured to assign the following categories to one or more features in an industrial reference: text, image, locations of the text and image, and relationship between the text and image.

In some embodiments, the system includes recognition and extraction software (also referred to as recognition software herein) configured to recognize and extract text from an industrial reference. In some embodiments, the instructions stored on the one or more non-transitory computer readable media include computer implemented steps that include: a preparation step for preparing the industrial reference for the step of recognizing and extracting printed text, a tiling step for tiling the industrial reference into sections, a recognition step for recognizing extracted text from each tile, a rotation step for rotating each tile, a rotated recognition step for recognizing and extracting text from each rotated tile, and/or an a reconstruction step for reconstructing the tiled industrial reference back into a single document.

In some embodiments, the system is configured to execute a preparation step that includes preparing an industrial reference for a step of recognizing and extracting printed text. In some embodiments, the preparation step includes a step of converting the industrial references into a high resolution (>200 dpi) digital document. In some embodiments, the system is configured to perform an image pre-processing step which includes automatically removing noise from the digital document and/or an enhancement of the text and/or drawings on the sheets. In some embodiments, proprietary software is used automatically removing noise from the digital document and/or an enhancement of the text and/or drawings on the sheets. In some embodiments, conventional software is used automatically removing noise from the digital document and/or an enhancement of the text and/or drawings on the sheets.

In some embodiments, the system is configured to implement a tiling step. In some embodiments, a tiling step includes computer implemented instructions to automatically divide the industrial reference into a plurality of sections (i.e., tiles). In some embodiments, the system is configured to produce a number of tiles based on a pre-defined pixel limit for each tile. In some embodiments, the pre-defined pixel limit is a function of pixel limits set by the recognition software.

In some embodiments, the system is configured to implement a recognition step. In some embodiments, the non-transitory computer readable media includes instructions stored thereon to send each tile to recognition software. In some embodiments, the recognition software is configured to recognize the text and return a text summary for each text instance. In some embodiments, a text instance includes a single character. In some embodiments, a text instance includes a complete word string and/or number string (i.e., a string of letters and or numbers not separated by a space).

In some embodiments, the recognition software is configured to return an instance description of each text instance. In some embodiments, an instance description includes one or more of: an x-coordinate, a y-coordinate, a width, a height, and a string. In some embodiments, a "string" is two or more characters within a predefined distance or space of each other. In some embodiments, the x and y coordinate include a corner of a shape (e.g., a square, circle, hexagon, etc.) defining the boundaries of the string, the "width" is the horizontal distance from one corner to the other, the height is a vertical distance from one corner to another, and the string is the text and/or number. In some embodiments, a diameter and or radius is used instead of or in conjunction with the width and height to describe complex shapes. In some embodiments, the system is configured to produce a tile location file (e.g., CSV) that includes one or more of the x-coordinate, a y-coordinate, width, height, the string, and/or the tiles' original location (x-coordinate, a y-coordinate, width, height) in the industrial reference.

In some embodiments, each tile is sent individually. In some embodiments, a plurality of tiles is sent to the recognition software together. In some embodiments, the recognition software is configured to process each tile sequentially. In some embodiments, the recognition software is configured to process two or more tiles in parallel. In some embodiments, the recognition software includes a plurality of recognition software configured to process two or more tiles in parallel. In some embodiments, a proprietary software package is used to recognize and extract the text. In some embodiments, a conventional software package is used to recognize and extract the text.

In some embodiments, the system is configured to implement a rotation step. In some embodiments, the non-transitory computer readable media includes instructions stored thereon to rotate each tile to create a rotated tile. In some embodiments, each tile is rotated between 0° and 359°. In some embodiments, each tile is rotated between 0° and 180°. In some embodiments, each tile is rotate between 0° and 90°. In some embodiments, the system is configured to send each rotated tile to the recognition software where it is processed as described previously. In some embodiments, the system is configured to create a copy of each tile and implement the rotation step on the copied tile to create a rotated copied tile. In some embodiments, the system is configured to send one or more rotated copied tiles individually and/or together with one or more non-rotated tiles as described above. In some embodiments, the system is configured to repeat the rotation step to rotate one or more tiles a plurality of times and send each rotation to the recognition software. In some embodiments, rotating and resending a tile enables differently oriented text within the same tile to be recognized.

In some embodiments, the system is configured to implement a reconstruction step. In some embodiments, the non-transitory computer readable media includes instructions stored thereon to reconstruct the original industrial reference from each text recognized tile. In some embodiments, the system is configured to use each tile's original location in order to reconstruct the industrial reference.

In some embodiments, the system is configured to create a reference location file. In some embodiments, the system is configured to modify the text location for each tile returned by the recognition software to match the location of the tile within the industrial software. In some embodiments, the system is configured to use the tiles' original location (x and y-coordinates) in the industrial reference to create the reference location file. In some embodiments, the system is configured to add each x and y-coordinate value in the tile location file to the x and y-coordinates for the original location to create the reference location file.

In some embodiments, the system is configured to implement an extraction step. In some embodiments, the extraction step includes instructions executed by the one or more processors to remove the text from the industrial reference. In some embodiments, the extraction step is configured to remove the text from each tile. In some embodiments, the extraction step is configured to use the tile location file to determine the location of the text and remove and/or replace pixels associated with the text. In some embodiments, the extraction step is configured to use the reference location file to determine the location of the text and remove and/or replace pixels associated with the text in the industrial reference. In some embodiments, the system is configured to replace the text pixels with pixels that match the background of the industrial reference.

In some embodiments, the one or more non-transitory computer readable media include instructions stored thereon for executing an industrial image recognition step. In some embodiments, the image recognition step includes instructions for training AI to recognize industrial images (e.g., piping, pumps, valves, charts, legends, etc.) within an industrial reference. In some embodiments, one or more industrial references are used to train the AI. In some embodiments, the one more industrial references used to train the AI are modified industrial references that have all text removed by one or more methods described herein. In some embodiments, one or more of the systems in methods described herein have been used to remove the text to create the modified industrial image.

In some embodiments, one or more training tiles are used as training for the AI. In some embodiments, the one or more training tiles includes a single image of an industrial image type. In some embodiments, the one or more training tiles includes a plurality of images types. In some embodiments, the AI is configured to learn the relationship between the plurality of images types. For example, in some embodiments, the AI is configured to learn that a straight line connecting a pump and a valve in a training tile is representative of a pipe image type. In some embodiments, the AI is configured to learn to recognize industrial image types within an industrial reference comprising a plurality of industrial images along with text characters.

In some embodiments, the system is configured to return an image location for each industrial image recognized. In some embodiments, the system is configured to return an image coordinates set for each industrial image recognized. In some embodiments, an image coordinate set includes one or more of an x-coordinate, a y-coordinate, a width, a height, and a diameter. In some embodiments, the system is configured to draw one or more recognition results on an industrial reference based on the image coordinate set. In some embodiments, the system is configured to output statistics on the recognition results to a conventional output file (i.e., text file, Excel®, CSV, etc.).

In some embodiments, the system is configured to train the AI to recognized and understand multiple types of information in an industrial reference. In some embodiments, the AI is configured to recognized and understand one or more of: text (characters), images, location of text and/or images, and the relationship between the text and images.

In some embodiments, the one or more non-transitory computer readable media include instructions stored thereon for executing an image identification step to train the AI. In some embodiments, an image identification step includes a step of clipping a first industrial image type (e.g., multiple images of a ball valve) such that >70% of all pixels in the clipping defines and area of the industrial image type. In some embodiments, each first industrial image is copied one or more times and each copied image is rotated. In some embodiments, each copied image is rotated between an angle of 0°-359°. In some embodiments, each copied image is rotated 90°. In some embodiments, each copied image is rotated 45°. In some embodiments, the each copied rotated image increases the image sample set size used to train the AI which results in improved AI recognition of an industrial image. In some embodiments, an AI training set includes a seed data set which includes the first industrial image and one or more of a plurality of the copied rotated first industrial images. In some embodiments, the system is configured to increase an image and/or text training set size by increasing the number rotated copies, where each copy is rotated to a different degree.

In some embodiments, when only small AI training set (<1000 images) is available, the system is configured to use a Prior to train the AI. In some embodiments, a Prior is an AI previously trained (i.e., prior trained) to recognized common images and/or includes a large database of those training images. It is important to note, that there is no known Prior that has been previously trained on industrial references, however, in some embodiments that include industrial references in other than dark line drawings (e.g., photographs) the Prior's general shape database becomes more useful. In some embodiments, common images include images of text, faces, and/or object found in a real world and/or digital environment. In some embodiments, since the Prior already has database of training images, it returns fewer false positives and false negatives than some untrained models.

In some embodiments, a Prior is not used and an untrained AI is used by the system and trained to recognize the industrial image. In some embodiments, if the formatting of an industrial reference is consistent (e.g., a P&ID or any other drawing described herein) an untrained model trained using the methods described herein saves computing time and resources as the AI does not have to search an extensive database. In some embodiments, one or more AI training systems and methods described herein are applied both to an untrained AI and a Prior AI.

In some embodiments, the one or more non-transitory computer readable media include instructions stored thereon for sending each first industrial image and/or each copied image to the AI and for executing the AI to attempt to recognize the image. In some embodiments, the system is configured to train the AI on which returned images are false positives and/or false negative. In some embodiments, the system is configured to continuously input variations of a first industrial image type until a predetermined percentage (i.e., also defined on a scale of 0.0 to 1.0) of hit rate, false positives and/or false negatives is achieved.

In some embodiments, the one or more non-transitory computer readable media include instructions stored thereon for sending a first industrial text and/or each copied text (rotated as described above in relation to a first industrial image) to the AI and for executing the AI to attempt to recognize the text. In some embodiments, the system is configured to train the AI on which returned text are false positives and/or false negative. In some embodiments, the system is configured to continuously input variations of a first industrial text type (i.e., a single character) until a predetermined percentage (i.e., also defined on a scale of 0.0 to 1.0) of hit rate, false positives, and/or false negatives is achieved.

In some embodiments, the system is configured to send a printed character set to train the AI (e.g., the large EnglishFnt printed character set). In some embodiments, the AI is configured to learn text shapes from the printed character set. In some embodiments, the printed character set better matches text found in most common industrial references.

In some embodiments, after the AI is seeded with the initial training set of text and images, the system is configured to send an industrial reference that includes a plurality of the first industrial image to the AI. In some embodiments, the industrial reference that includes a plurality of the first industrial image has had all text removed as described above. In some embodiments, the one or more non-transitory computer readable media include instructions stored thereon for enabling clipping of one or more recognized industrial images from the industrial reference and enabling saving the industrial reference clipping in database (e.g., a historian).

In some embodiments, the false positive rate for the industrial image is relaxed. In some embodiments, the industrial image false positive rate is related to generate a higher number of returned first industrial images from an industrial image. In some embodiments, the system is configured to enable a user to sort which returned industrial images are positive and negative samples.

In some embodiments, the system is configured to rotate and/or flip the positive samples one or more times (as described above) and send them back to the AI as part of the seeding training set. In some embodiments, the system is configured to add the negative samples to a background dataset. In some embodiments, this creates a large sample set in which to train the AI. In some embodiments, after training the AI according to at least a portion of the system and method described herein, the AI is configured to return excellent first industrial image recognition for a given industrial image type.

In some embodiments, system is configured to implement the steps described above for a second industrial image (e.g., a pump), a third industrial image (e.g., a heat exchanger) and so on until all text and/or industrial images within an industrial reference are recognizable by the AI. In some embodiments the AI is configured to return any combination of characters and/or images within an industrial reference at one or more of: at least 99.9% hit rate, less than 1% false, and/or less than 1% false negatives for any industrial image and/or text within an industrial reference type.

DRAWING DESCRIPTION

DETAILED DESCRIPTION

Figure 1:
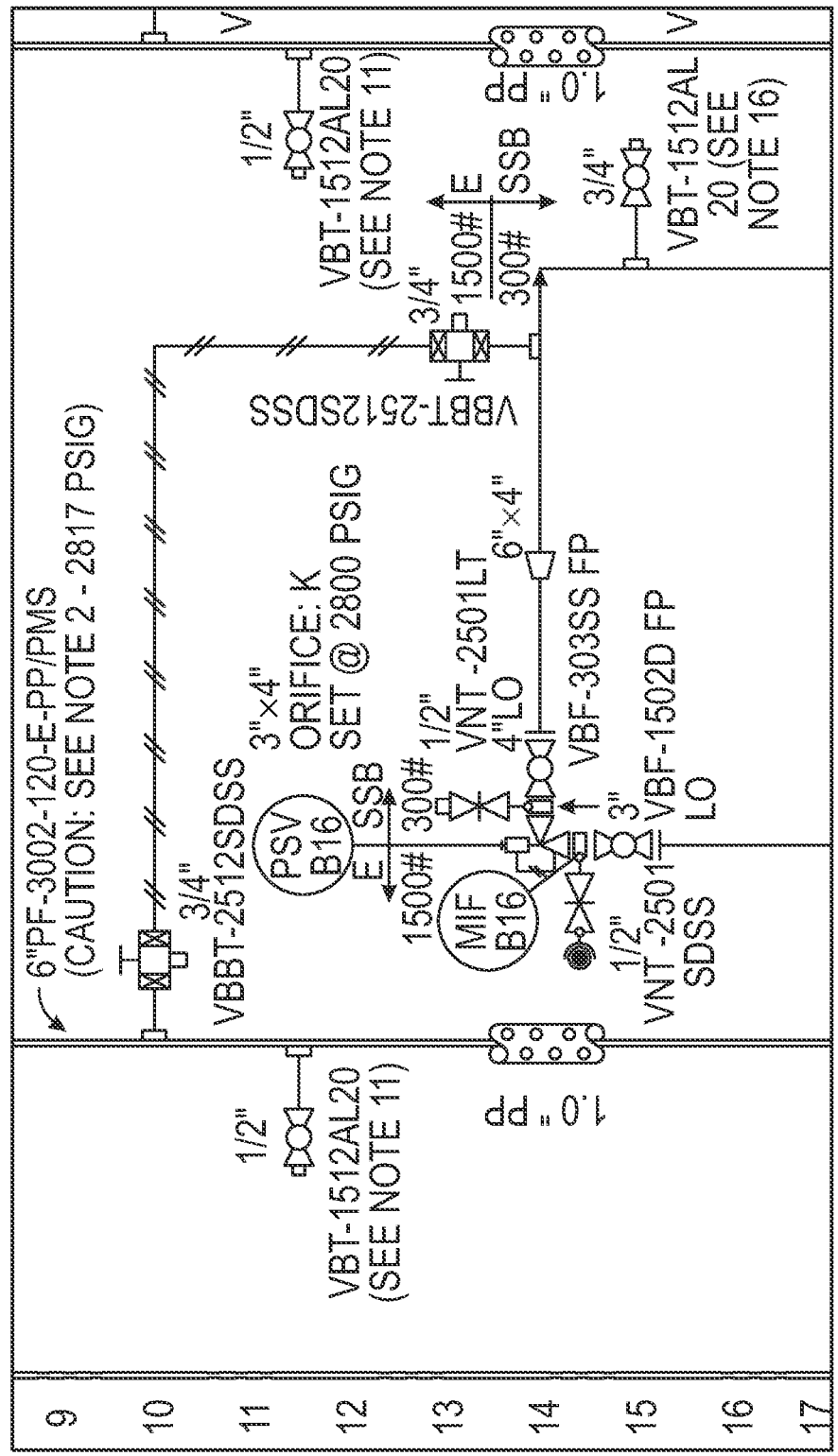
FIG. 1 illustrates an example industrial reference in the form of a piping and instrumentation diagram (P&ID) according to some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

In some embodiments, the system is configured to provide an AI engine to effectively "understand" engineering diagrams and increasingly "intelligently" and autonomously interact with users—engineers and business managers—based on the information contained in them.

In some embodiments, the system is configured to provide broad ingestion capabilities which can include, without limitation, integrating ingested data with existing solid models.

In some embodiments, the system is configured to integrate functionality with AVEVA Net (which is commercially available from AVEVA Group plc and its affiliates.) Gateways are part of AVEVA Net functionality. Some embodiments provide an upgrade to the current capabilities of AVEVA Net, offering, without limitation, enhanced ingestion of data which are may or may not be contained in CAD files, spreadsheets and the like.

In some embodiments, the system is configured to provide enhanced capabilities for automatically onboarding data to help optimize processes. In some embodiments, the system is configured to enable users to search, fetch, and effectively display engineering diagrams based on the user's content and/or preferences. Some embodiments can comprise, without limitation: piping and instrumentation diagrams (P&ID), electrical plans, power plant, electronic circuit diagrams, block diagrams, logic diagrams, HVAC, process flow, welding and wiring diagrams, flow charts, class diagrams, state transition and timing diagrams. In some embodiments, the system is configured to recognize, without limitation, business diagrams such as audit, work flow diagrams and Gantt charts. In some embodiments, the system is configured to regonize, without limitation, construction diagrams, such as floor plans, site plans, structural, and plumbing drawings. In some embodiments, the system is configured to recognize, without limitation, oil and gas diagrams, such as anticline, channel sands, fault trap, frac imaging, and the like.

FIG. 1 illustrates a piping and instrumentation diagram according to some embodiments. In some embodiments, piping and instrumentation diagrams comprises several types of information. Some embodiments comprise information for training an AI Engine to recognize and understand a wide variety of content types and formats. In some embodiments, the information for training an AI Engine comprises, without limitation: text, instrumentation symbols and locations of both, relationships and associations between the text and the symbols, and the like.

In some embodiments, the system is configured to ingest information regarding the particular assets of interest. Many prior art systems can store information identifying an asset as a pump according to some embodiments. While these systems are useful, some embodiments disclosed herein offer enhanced functionality which can include, without limitation, identification and ingestion of actual asset characteristics which includes a pump's operating characteristics. In some embodiments, this enhanced functionality can lead to significantly better optimization strategies because high efficiency assets (or conversely, low efficiency assets) are taken into account. In some embodiments, such assets can include tags (e.g. VBF-302) which can comprise the operating characteristics or enable tracking thereof through association with the asset. In some embodiments, the system is configured to build a neural network including these characteristics to lead to better optimization outcomes. In some embodiments, the system is configured to anonymize the data so that they can be used for other customers or environments. As one non-limiting example, the pump operating characteristics can be stored from one ingestion and automatically or manually populated into another neural network when the same pump is used according to some embodiments.

Further, in some embodiments, such enhanced knowledge by the neural network can be used to enhance setup and operating performance based on location or operating environment conditions. Additionally, such enhanced knowledge can improve predictive analyses including maintenance scheduling and the like.

Figure 2A:
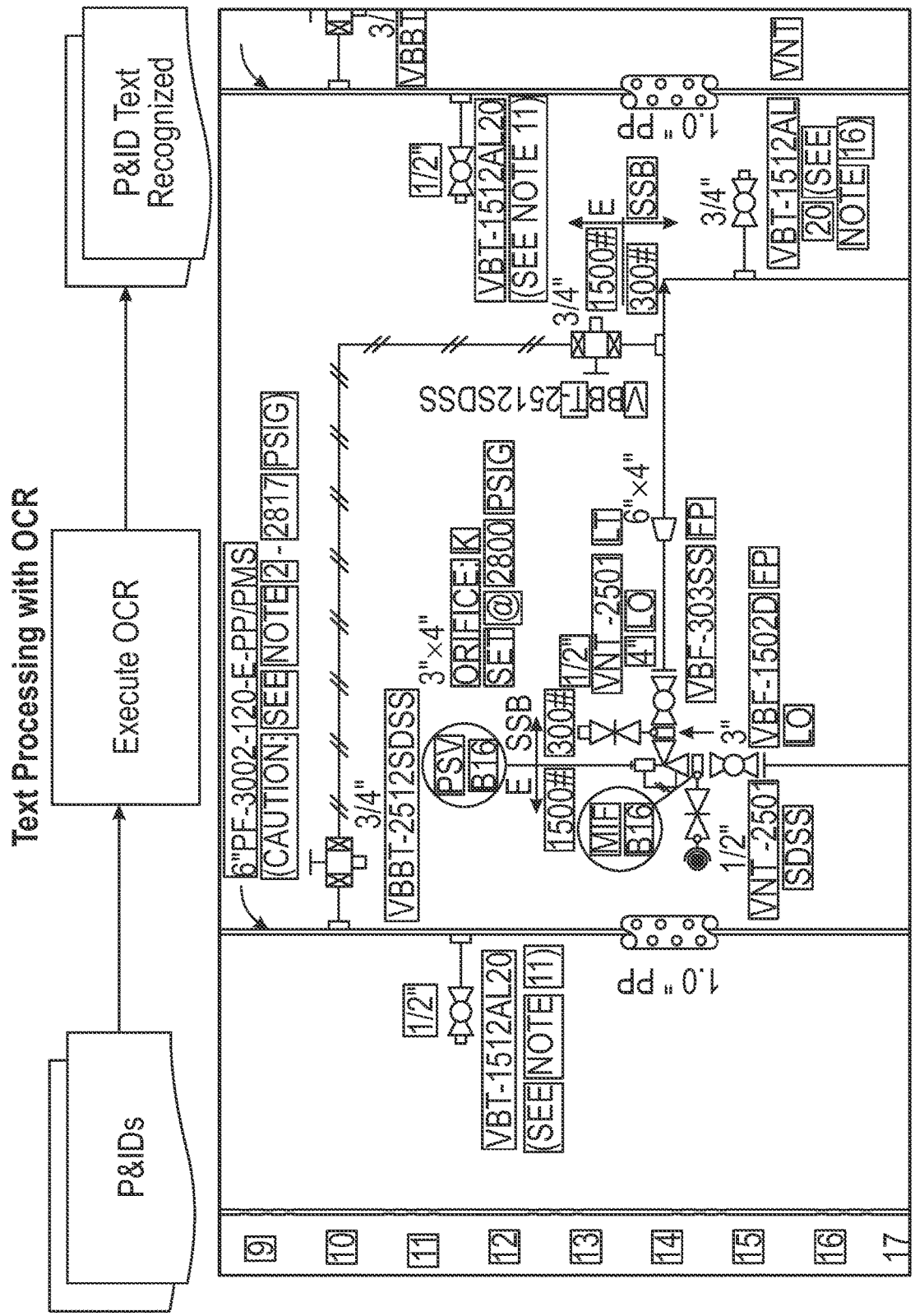
FIG. 2A depicts a P&ID with the location of each text enclosed in an identifying square according to some embodiments.
Figure 2B:
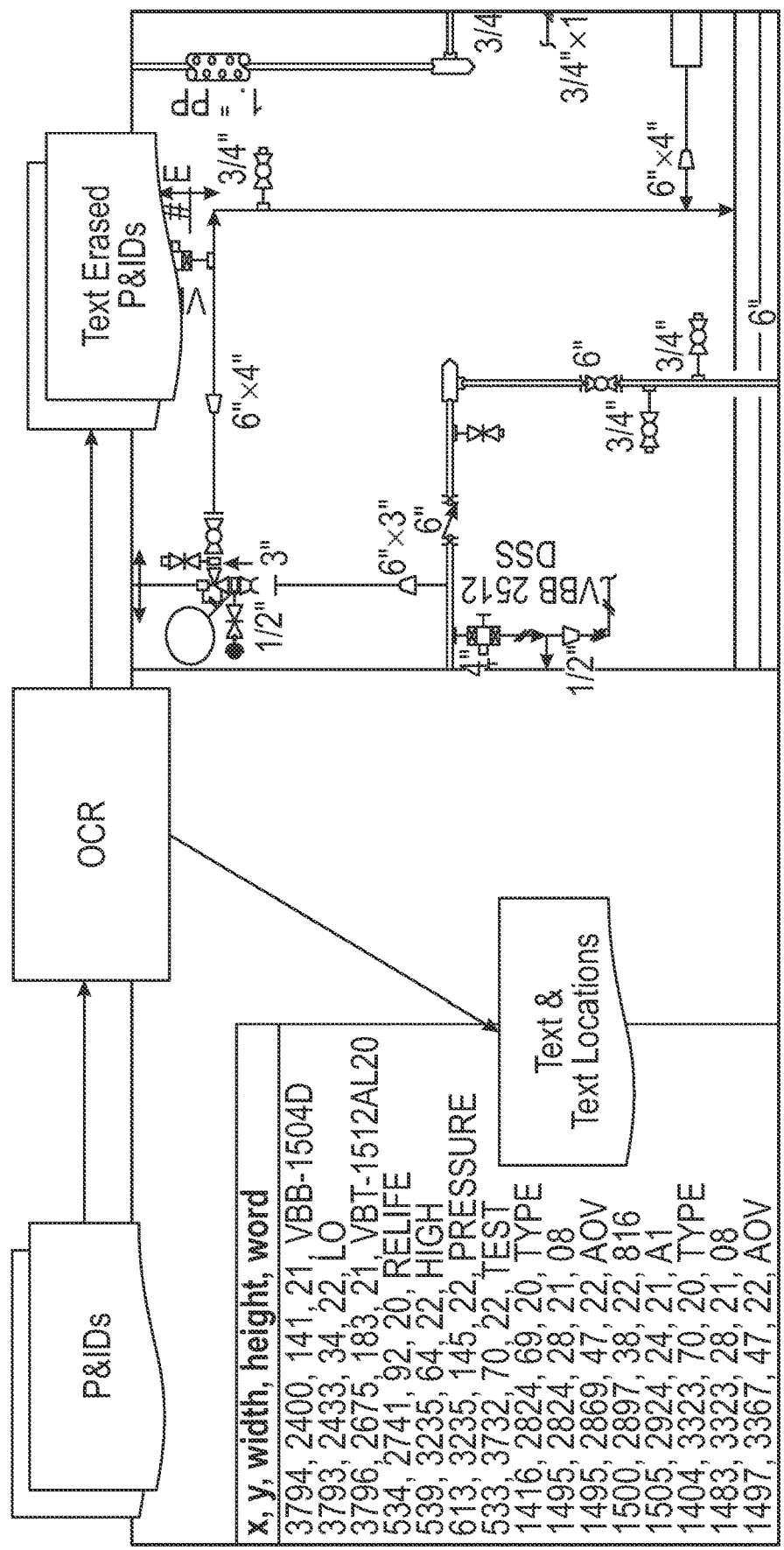
FIG. 2B depicts a P&ID with the characters removed by some embodiments described herein.

FIGS. 2A-2B illustrate text processing with Optical Character Recognition ("OCR") according to some embodiments. In some embodiments, the system is configured to use a conventional software for printed text recognition such Microsoft Software® Azure® OCR. In some embodiments, the system is configured to integrate Azure® Cognitive Services OCR to recognize and extract printed text on the piping and instrumentation diagrams. Azure® is a registered trademark of Microsoft Corporation of Redmond, Wash.

In some embodiments, the system is configured to enable a user to convert one or more an industrial images such as a paper sheets to high resolution (200 dpi) images from SVG and PDF formats. In some embodiments, the system is configured to perform image pre-processing to remove noise and enhance both text and drawings on the sheets. In some embodiments, Azure® service can have a 4200×4200 pixel size limit. In some embodiments, the system is configured to tile each paper sheet, process all paper sheets one at a time, and add the results back together. In some embodiments, the system is configured to capture sideways text. In some embodiments, the system is configured to capture sideways text by rotating the paper sheet 90° degrees clockwise on each tile and repeat the OCR process. In some embodiments, the system is configured to enable a user can correct the OCR model deficiencies as a series of special cases.

In some embodiments, the OCR model can comprise two or more results. In some embodiments, the first result comprises separating the recognized text and saving the text locations in CSV format for use in text NLP based search and display of piping and instrumentation diagrams. In some embodiments, a second result comprises erasing recognized text. In some embodiments, the system is configured to take the text removed piping and instrumentation diagram sheets forward for symbol recognition. It should be noted that Azure® OCR does not capture a small fraction of the text which is left behind.

In some embodiments and as just one non-limiting example, In some embodiments, the system is configured to execure a ball valve analysis. In some embodiments, ball valve recognize is divided into two separate classes. In some embodiments, the classes can comprise class horizontal ball valve ("HBV") and class vertical ball valve ("VBV").

Figure 9:
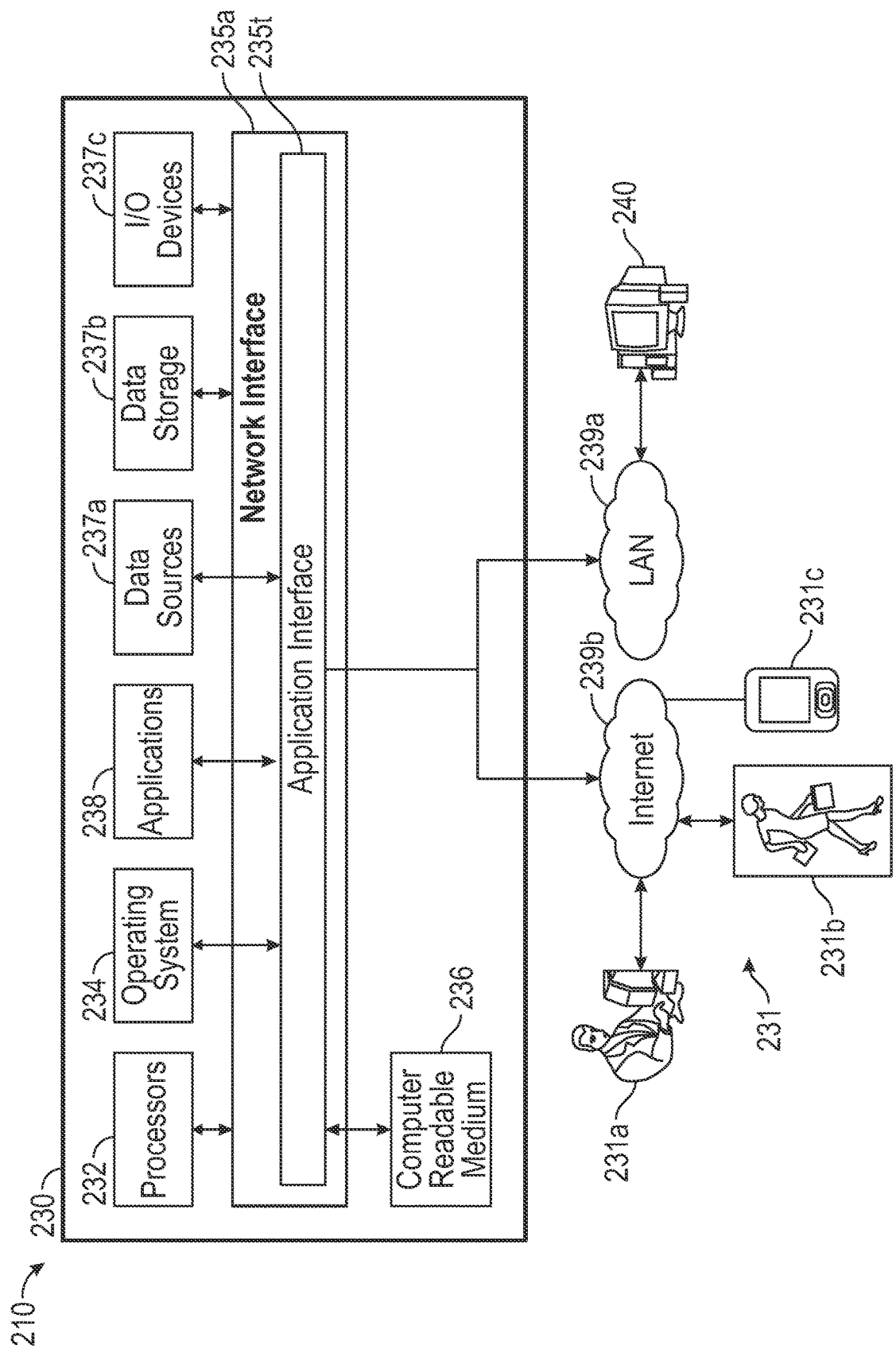
FIG. 9 illustrates a computer system enabling or operating the system according to some embodiments.

FIG. 9 shows ball valve classes according to some embodiments.

In some embodiments, the system is configured to execute a ball valve recognition—dataset generation. In some embodiments, having found no public or private dataset of P&ID symbols, the system is configured generate a dataset of samples. In some embodiments, the system is configured to generate the dataset of samples by clipping a plurality of samples of a ball valve from 200 dpi or other resolution text-removed shell piping and instrumentation diagram sheets by hand.

In some embodiments, the system is configured to turn each clipping by 90°, 180° and 270° degrees. In some embodiments, the system is configured to flip each clip along horizontal and vertical axes. In some embodiments, the flipped clipping can produce a sample dataset of 216 horizontal and 216 vertical ball valves, for example. In some embodiments the sample dataset is a seeding dataset to train AI.

Figure 10:
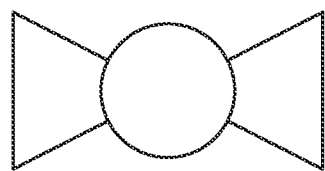
FIG. 10 shows example rotated ball valves according to some embodiments.
Figure 10:
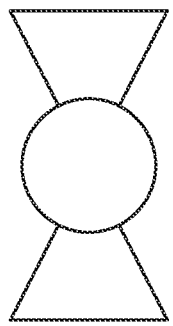
Figure 11:
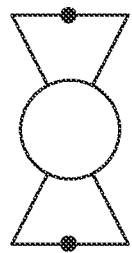
FIG. 11 shows example ball valve clippings used to train the AI according to some embodiments.
Figure 11:
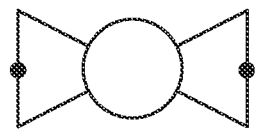
Figure 11:
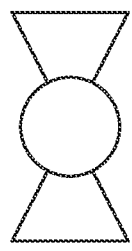
Figure 11:
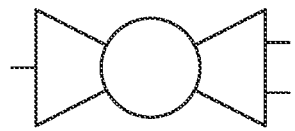
Figure 11:
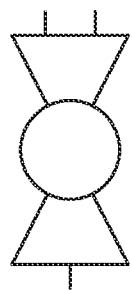
Figure 11:
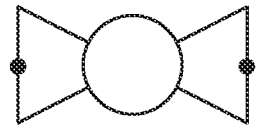
Figure 11:
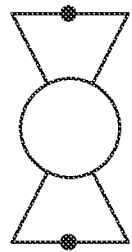
Figure 11:
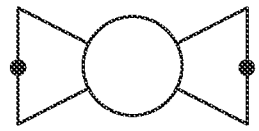

FIG. 10 shows example rotated ball valve clippings according to some embodiments.

In some embodiments, the system is configured to extract and transform data while keeping formats as close to native as possible or as desired. In some embodiments, the system is configured to build one or more neural networks for recognition of a wide variety of data types and formats.

Figure 3A:
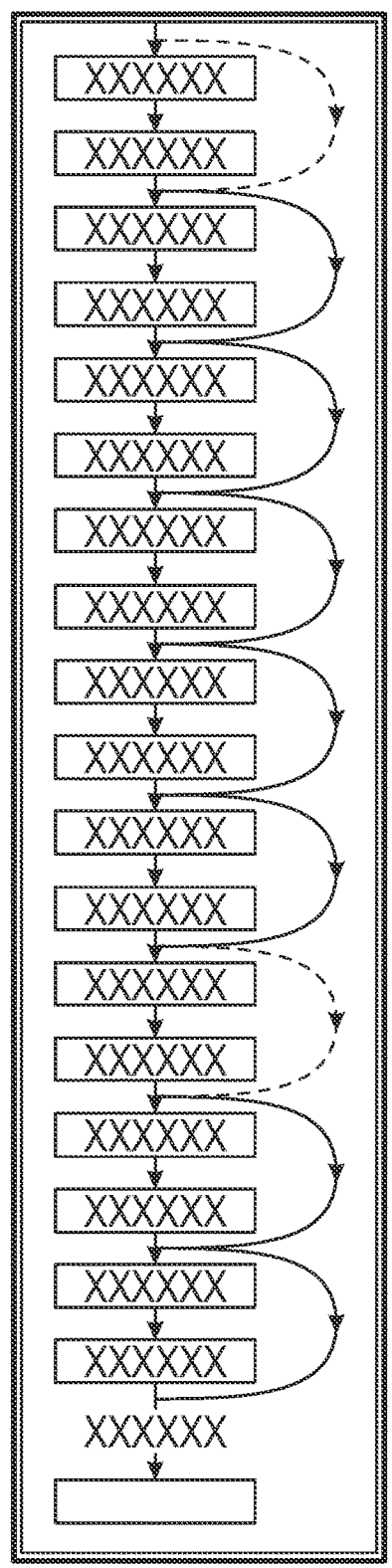
FIG. 3A shows a representative artificial intelligence according to some embodiments.
Figure 3B:
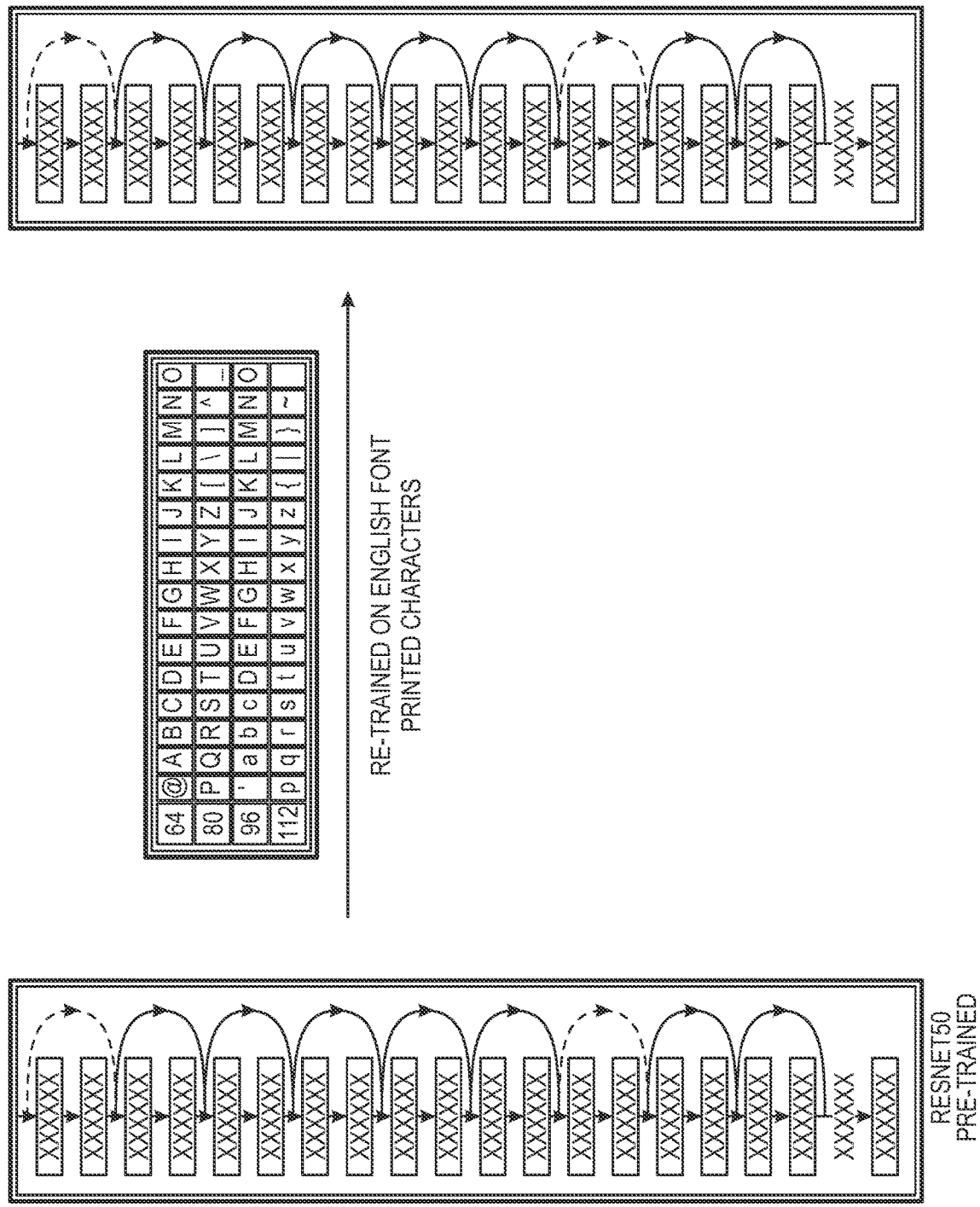
FIG. 3B depicts training the representative artificial intelligence to recognize printed characters using a character set according to some embodiments.
Figure 3C:
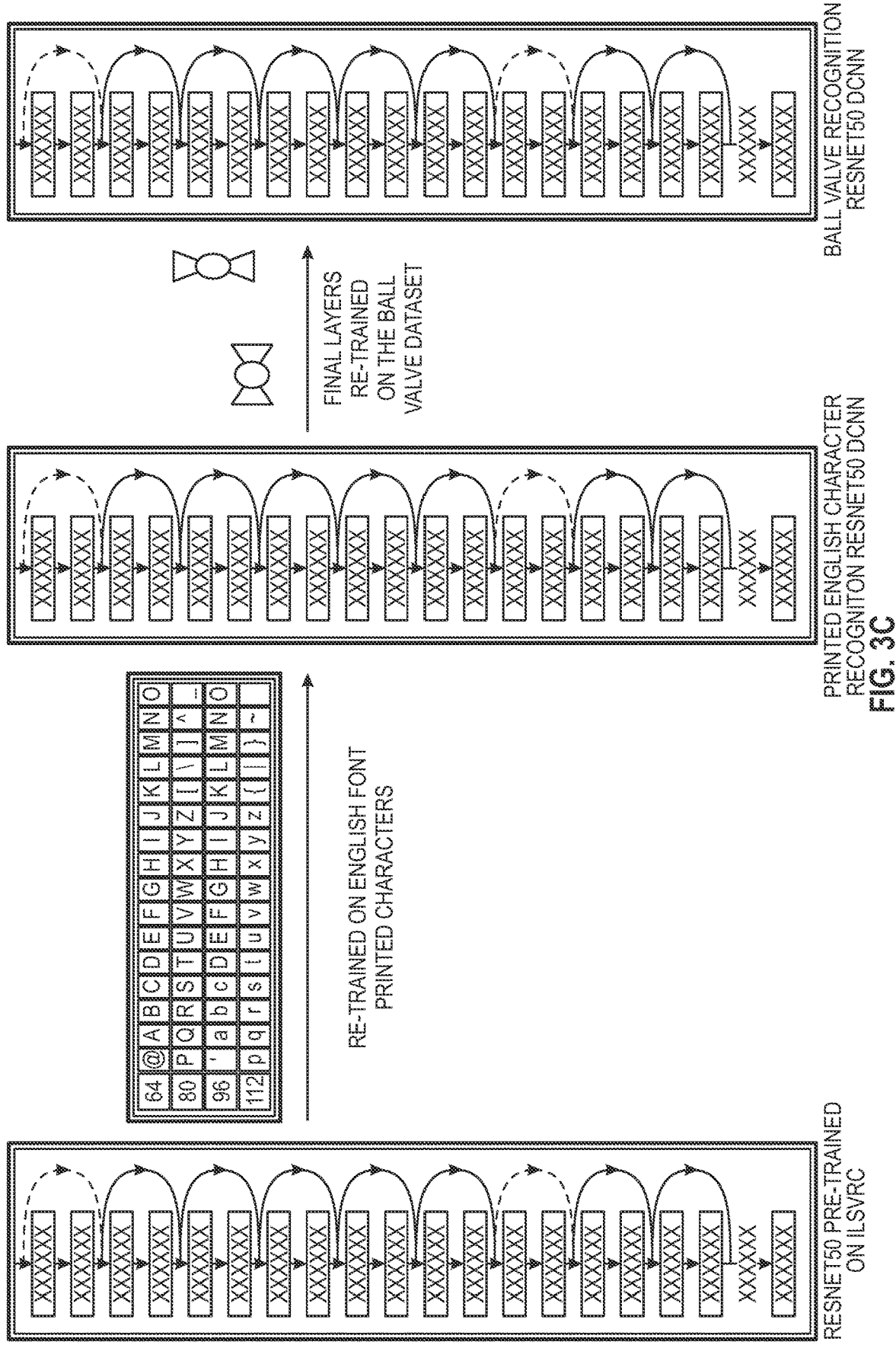
FIG. 3C depicts training the representative artificial intelligence to recognize ball valves according to some embodiments.

FIGS. 3A-3C illustrate a deep convolutional neural network for ball valve recognition according to some embodiments. In some embodiments, the system comprises a deep convolutional neural network for ball valve recognition. In some embodiments, various types of models can be trained for the task. In some embodiments, the first model can be a deep convolutional neural network ("DCNN"). In some embodiments, the DCNN can comprise a deep residual network architecture. In some embodiments, system comprises a ResNet50 DCNN model. In some embodiments, the ResNet50 DCNN model is trained to recognize 1000 everyday objects, including, faces, cars, footballs, and the like. In some embodiments, the ResNet50 DCNN is used as a Prior. In some embodiments, it can take large datasets to train a DCNN. In some embodiments, a dataset of 216 samples generated from the clippings is a small dataset, so a Prior comprising a database of everyday recognized images is used to increase the training set size. In some embodiments, the system is configured to integrate Python Keras to train the DCNN ResNet model.

Figure 4:
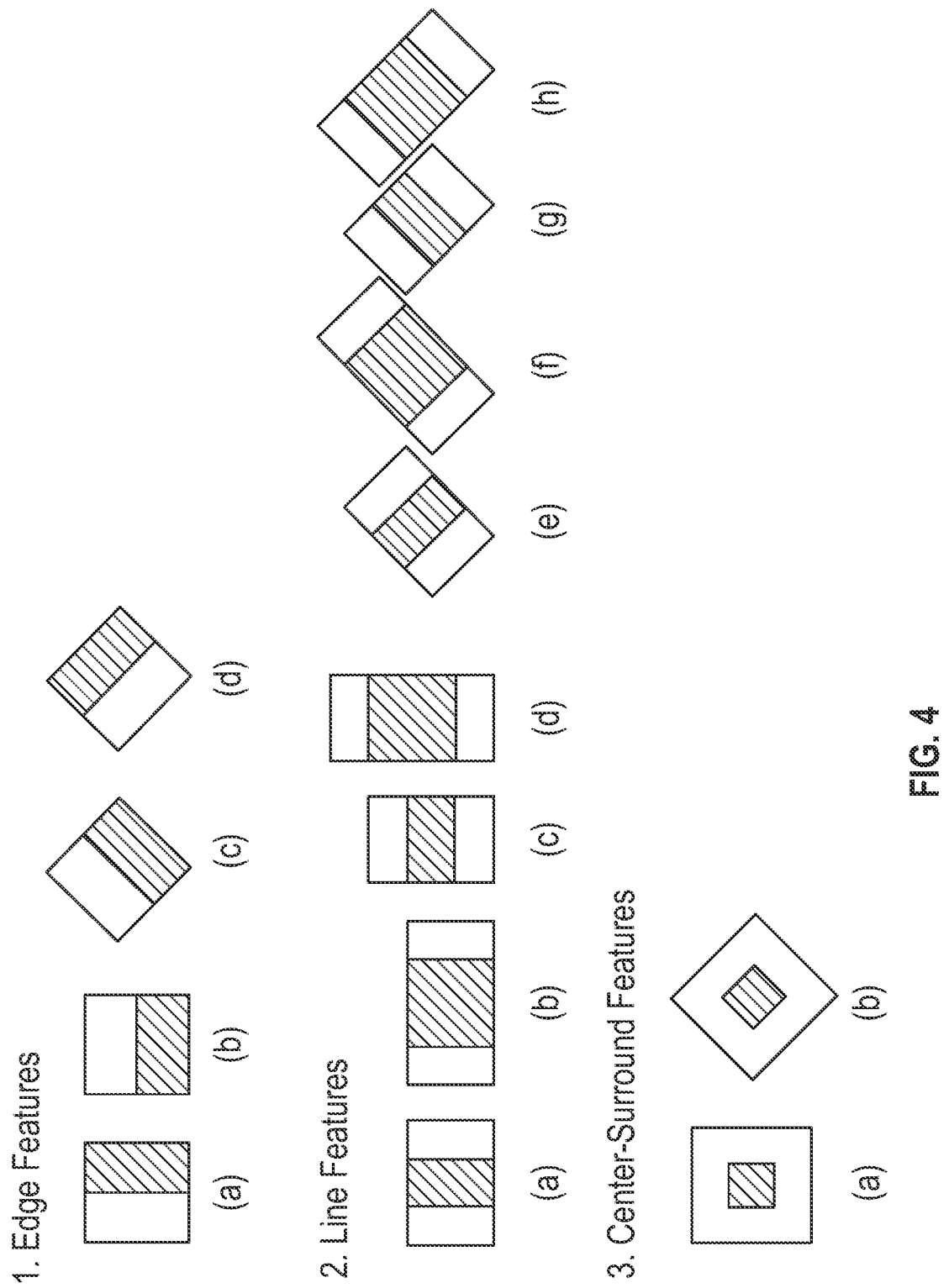
FIG. 4 illustrates a representative untrained artificial intelligence in the form of Boosted HAAR Cascades used for ball valve recognition according to some embodiments.

FIG. 4 illustrates a boosted HAAR cascades for ball valve recognition according to some embodiments. In some embodiments, the system comprises a boosted HAAR cascades for ball valve recognition (any step that references to a specific industrial reference image is purely an example and not limiting as any steps described herein applies to any industrial reference image). In some embodiments, a HAAR cascade can be known to learn simple features such as horizontal, vertical, and angled lines which are core features of many problem spaces. In some embodiments, HAAR cascade can be known to learn features from small datasets. In some embodiments, algorithm can train the models and run recognition. In some embodiments, training and recognition can comprise a pixel domain.

Figure 5:
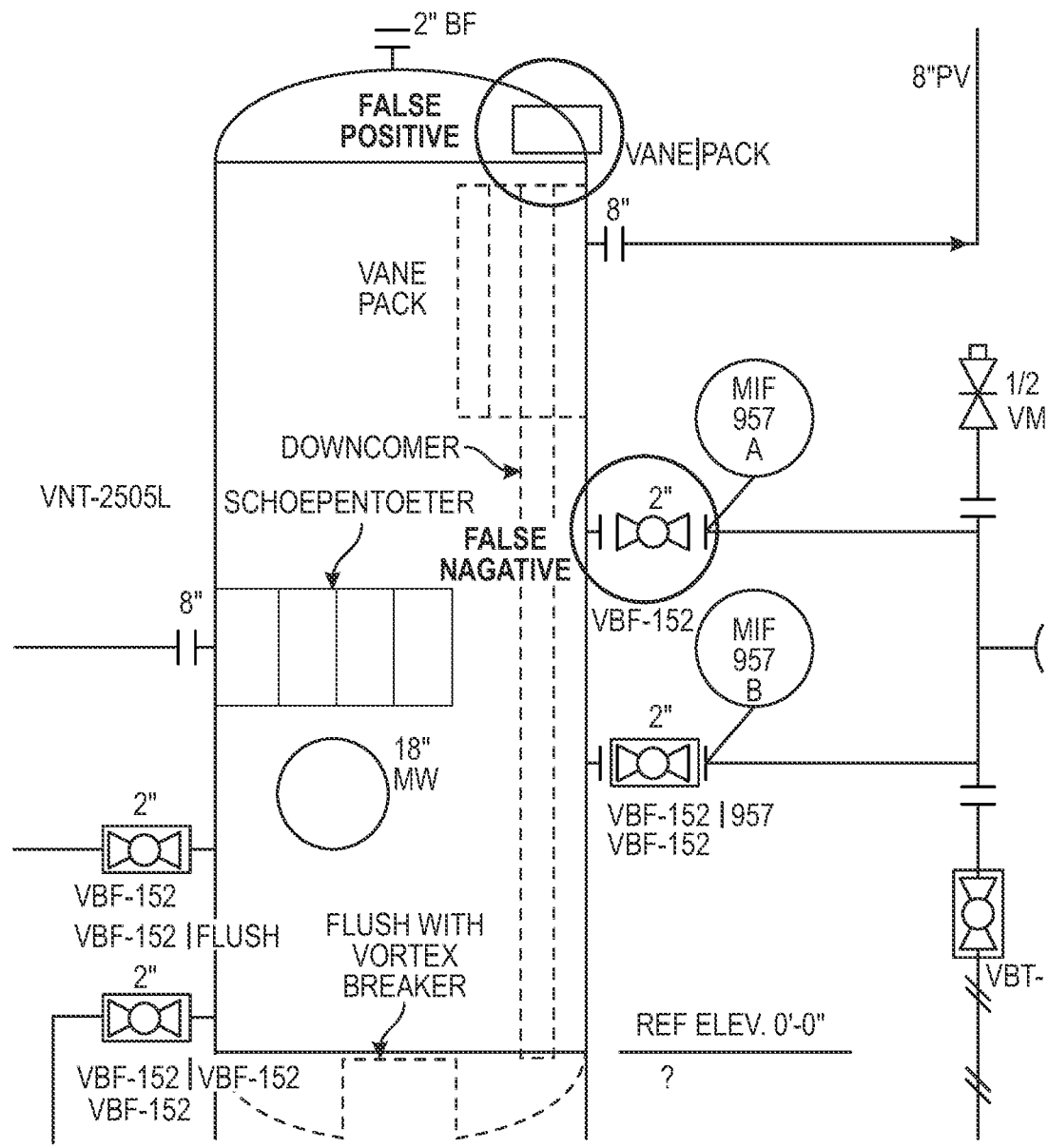
FIG. 5 shows an industrial reference in the form of a P&ID with ball valves recognized by the system surrounded by circles and/or squares.

FIG. 5 illustrates a hit rate according to some embodiments. In some embodiments, there can be two important performance metrics for training a model. In some embodiments, hit rate can comprise a converse of the false negatives rate. In some embodiments, false negatives can occur when a model fails to identify ball valves. In some embodiments, false negative rate can comprise scores between [0.0 and 1.0]. In some embodiments, 1.0 can provide a perfect hit rate that can capture all ball valves. In some embodiments, a hit rate can comprise a false positive rate. In some embodiments, false alarms can occur when a model identifies areas that are not ball valves. In some embodiments, false positive rate scores can be between [0.0 and 1.0]. In some embodiments, 0.0 rate can provide no additional areas marked as ball valves.

In some embodiments, the system is configured to accept 99.9% (e.g., −minHitRate 0.999) as an acceptable hit rate which are accepted in the final model. In some embodiments, after the model training session, an algorithm can provide a recognition run on the positive training samples. In some embodiments, the recognition run must recognize 999 out of 1000 ball valves, (i.e. the recognition run may misrecognize only 1 in 1000).

In some embodiments, the system is configured to define a training for maximum false positives rate. In some embodiments, the system is configured to enable false positives rate to be set to 1% (−maxFalseAlarmRate 0.01). In some embodiments, the system is configured to provide a recognition run on the negative training samples. In some embodiments, the system is configured to not recognize fewer than 1 in 100 images in an industrial reference as ball valves. In some embodiments, the system is configured to end the AI training session and consider the AI is trained when these criteria are met.

In some embodiments, the system is configured to enable a user can to relax the false positives rate to generate a large sample set. In some embodiments, the industrial references training set comprises 5-10 piping and instrumentation diagram sheets. In some embodiments, a training set for a piping and instrumentation diagram sheet, for instance is pre-processed by the system for text-removal from an OCR stage. In some embodiments, the system is configured to include a set of coordinates for each ball valve recognized.

Figure 6:
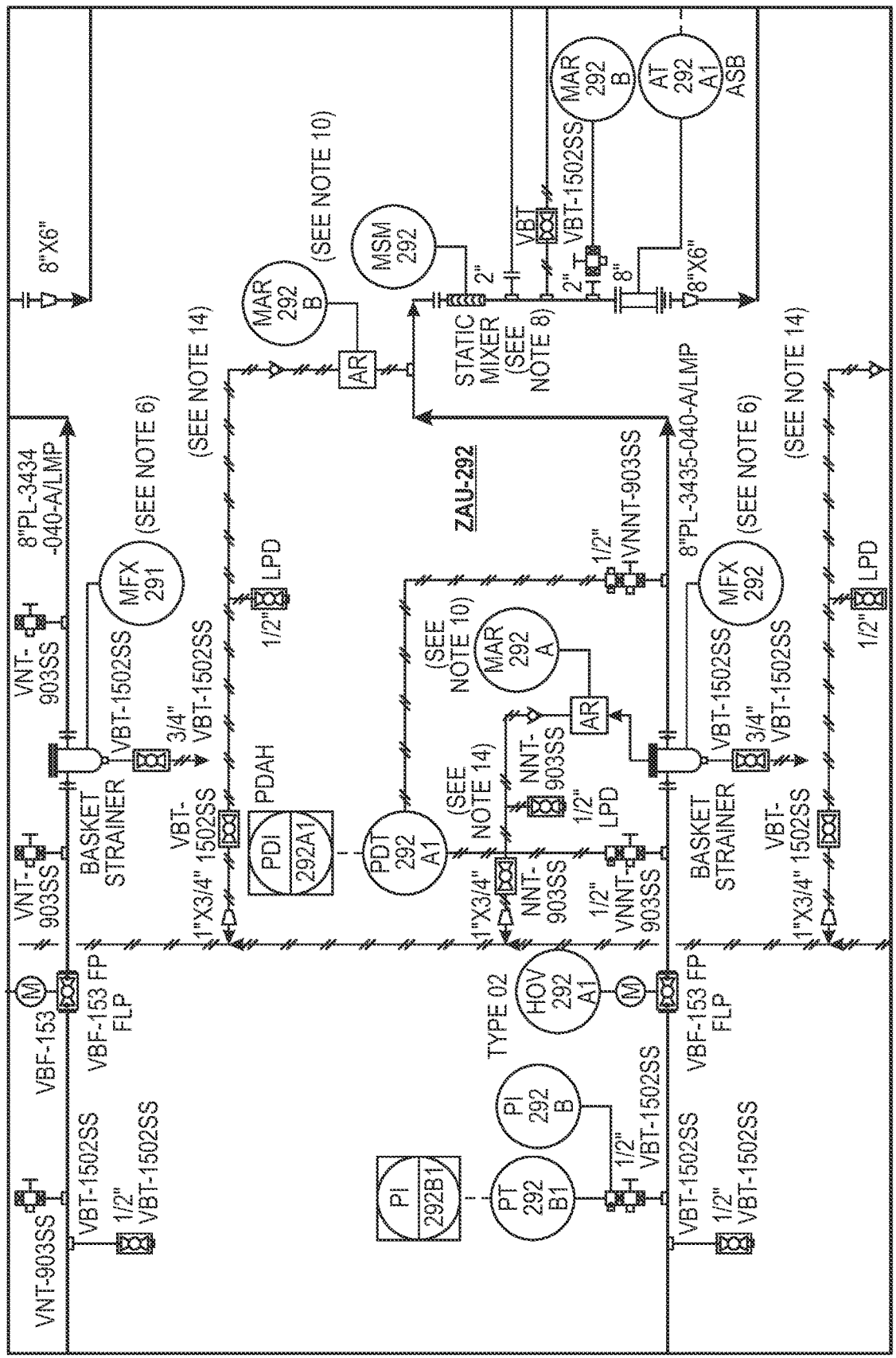
FIG. 6 shows another industrial reference in the form of a P&ID with ball valves recognized by the system surrounded by circles and/or squares.

FIG. 6 illustrates recognition results according to some embodiments. In some embodiments, the system is configured to return a set of coordinates for each ball valve can include x and y coordinates. In some embodiments, the x and y coordinates are located on the top left corner of each recognized ball valve. In some embodiments, a set of coordinates comprises a width and height in pixels. In some embodiments, the width and height pixels can include: x, y, w, h. In some embodiments, the system is configured to to draw out the recognition results on each respective original piping and instrumentation diagram sheet. In some embodiments, output statistics on recognition results can comprise a CSV file.

In some embodiments, the system is configured to clip all recognized samples. In some embodiments, recognized samples comprises 5-10 training sheets into a database folder. Some embodiments include relaxing the accepted false positives rate to 0.6 and above. In some embodiments, clippings can be separated into positive and negative samples. In some embodiments, the system is configured to rotate and flip the positive samples. In some embodiments, the system is configured to add the positive samples to a training dataset. In some embodiments, the system is configured to add negative samples as background samples in the dataset.

In some embodiments, the system is configured to generate large sample sets. In some embodiments, a large sample set can comprise approximately 2000 positive and 14000 negative samples. In some embodiments, the system is configured to use the large sample set to train models as a seed dataset. In some embodiments, the large sample datasets are needed to provide excellent results on hundreds of piping and instrumentation diagram sheets previously unseen by the model.

Figure 7:
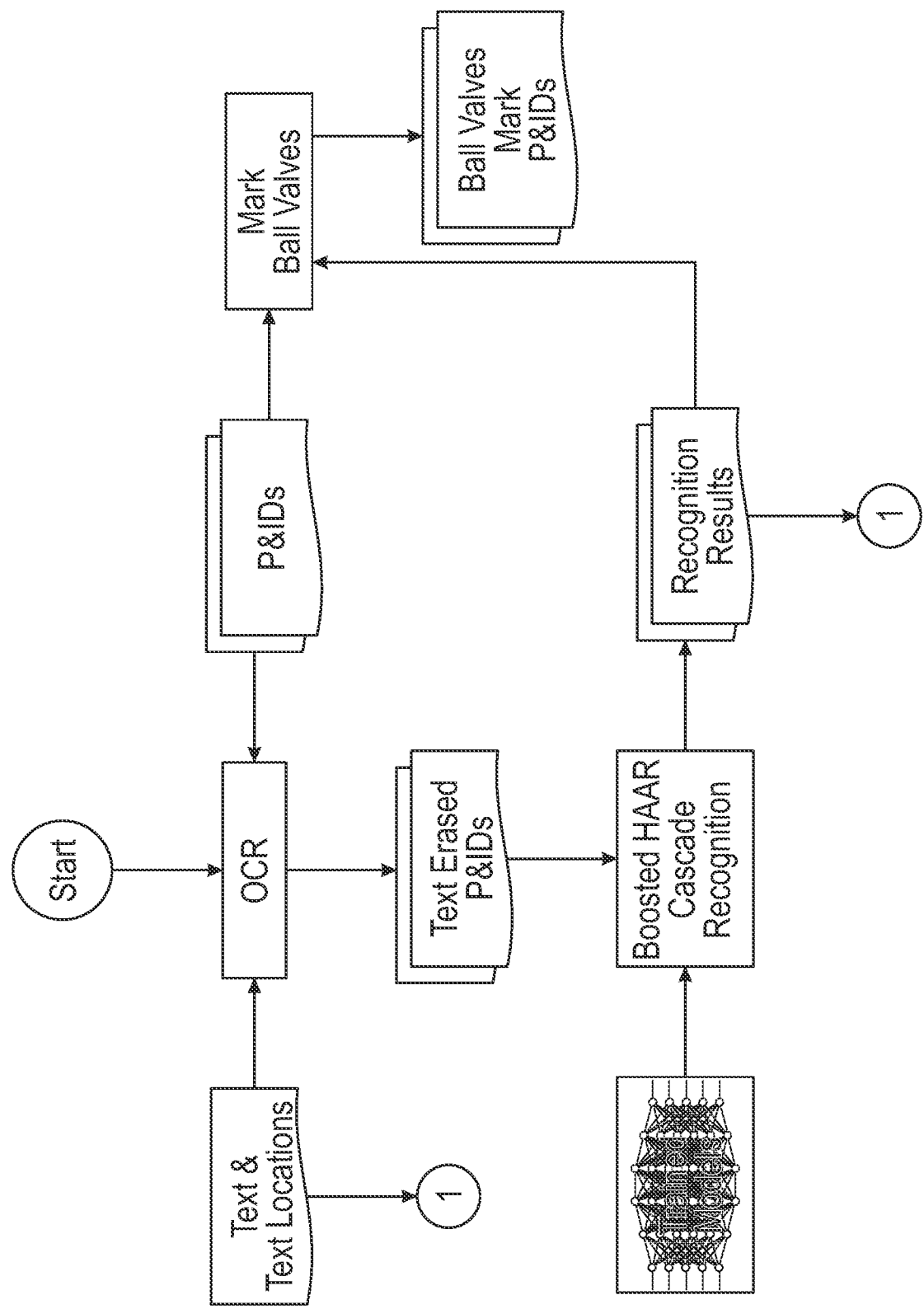
FIG. 7 illustrates OCR and symbol (ball valve) recognition workflow according to some embodiments.

FIG. 7 illustrates OCR and symbol (ball valve) recognition workflow according to some embodiments. In some embodiments, the system includes a TF-IDF NLP kernel for keyword extraction. In some embodiments, text extracted from piping and instrumentation diagrams with OCR can be a mix of significant words. In some embodiments, the mix of significant words can comprise high information content and insignificant words with low information content. Some embodiments include, TF-IDF natural language processing ("NLP") kernel. In some embodiments, TF-IDF natural language processing ("NLP") kernel can separation of significant words and can discard words with low information content.

Figure 8:
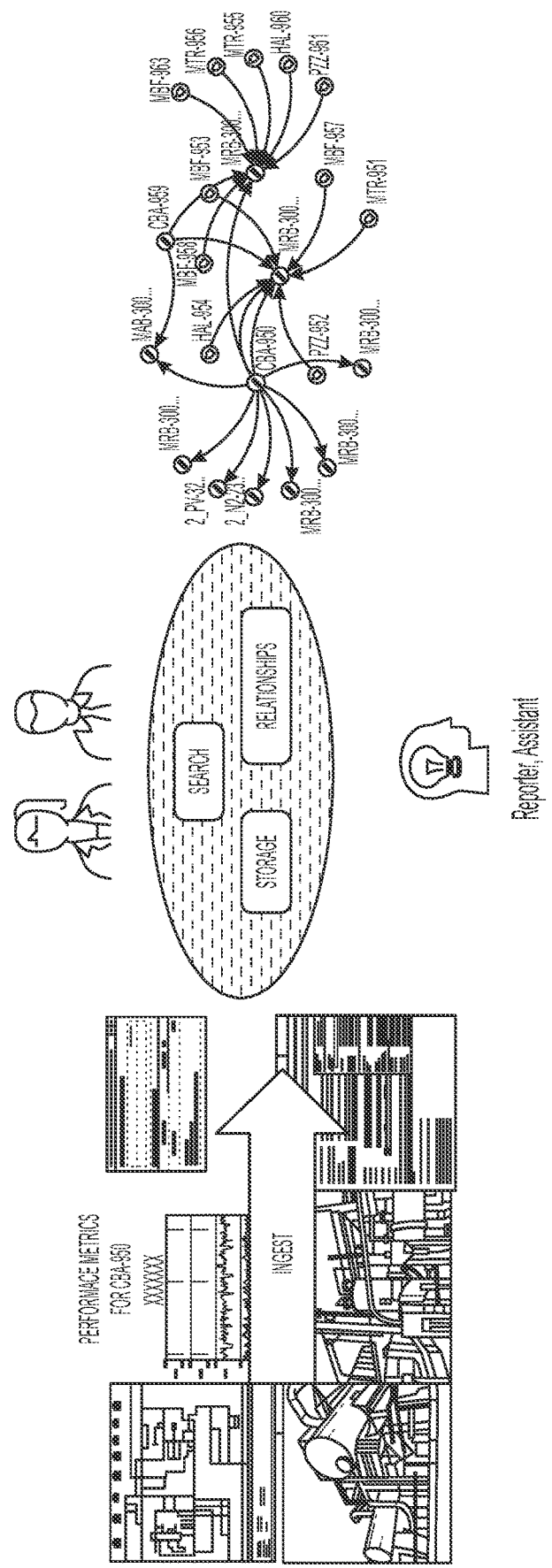
FIG. 8 illustrates digital twin assists according to some embodiments.

FIG. 8 illustrates digital twin assists according to some embodiments. Some embodiments include functionality based on various faces of life. In some embodiments, faces of life can comprise private, professional, and a user's role. Digital twin technologies can be very helpful for providing all data needed at any time, but sometimes the data lakes become extremely cumbersome and inefficient. Some embodiments provide needed context and data applicability to enhance use and analyses of the data lake.

In some embodiments, a user's role can comprise the beginning of a career. In some embodiments, a user can want to learn fast, need help and answers on tap, and want to connect with likeminded users. In some embodiments, connection with likeminded users can be from anywhere in an approved trusted user network or a Bot network.

In some embodiments, a user can trust Bots and know how to contribute to their learning. In some embodiments, a user can be notified by the system to multi-task efficiently. In some embodiments, a user can be presented with content/ information that is relevant to a user's role, tasks, or schedule. In some embodiments, a user's search history, time the user takes to act and/or execute can be used to drive a user's productivity. In some embodiments, a user can correct the Bot.

Some embodiments include an assistant and some embodiments include a profile. In some embodiments, the assistant can be a user's profile. In some embodiments, a user's profile can drive work ethic and a digital fingerprint.

Some embodiments include a human network. In some embodiments, the human network can comprise the Bots and assistants network. In some embodiments, the network can be provided by Trusted Network and Human Digital Footprint in the Eco-System network which may include assets/facilities information networks). In some embodiments, the Trusted Network can comprise opposites attract, complementary skills, one team—one fight, and crowd source analyses and recommendations to deliver desired results.

Some embodiments include an opinion for suitability. In some embodiments, the opinion for suitability can record metrics, e.g. task rate completion, constant revisiting of the same content, and questions to learn more. In some embodiments, a user can ask questions to learn more, confirm what a user already knows, why something is the way it is, design intent, OEE, and surveys.

Some embodiments include a human digital footprint. In some embodiments the human digital footprint can be in the Eco-System. In some embodiments, people's network footprint can comprise, past experience to solve the problem, challenge, and/or opportunity. In some embodiments, a user can touch data or act upon data every day for a purpose (why). In some embodiments, a user can annotate and/or exercise the Eco-System relevance to all information networks. In some embodiments, the assistant can inform fellow Bots of new annotations and/or facts.

Some embodiments include a reporter. In some embodiments, a reporter can comprise crawling, listening, and reporting.

In some embodiments, as noted above, a reporter can crawl content. In some embodiments, a reporter can be interested in things that have been programmed and/or configured. In some embodiments, a reporter can comprise anomalies. In some embodiments, anomalies can be positive and negative. Some embodiments include dependability on people, systems, output from other Bots, for content to crawl. Some embodiments include adherence to privacy and respected anonymized content.

In some embodiments, a reporter can listen. In some embodiments, a reporter may not have access to AU systems. In some embodiments, a reporter can listen for published events, and even when a reporter does have access the reporter may still need events to initiate system action.

In some embodiments, the reporter can report useful information of many types. In some embodiments, the reporter can state fact, unbiased and with zero emotion. In some embodiments, a reporter can infer a need for a baseline, standard, and/or other factors or data to begin from. In some embodiments, a reporter can evolve "reportation" based on one or more evolving baselines.

In some embodiments, tribal knowledge can be used to design and evolve the system. Transient contributors such as independent contractors can add content which is readily digested by the system and can be acted on my one or more neural networks. One non-limiting example of this content is a cooling system expert's input which can be used in one or a large number of systems. Some embodiments log or learn what user's skillsets are in order to best present those data they need. And some embodiments preserve the original data, allowing the data to be re-annotated or remapped to ensure completeness and enabling the addition of any needed context.

FIG. 9 illustrates a computer system enabling or operating the system according to some embodiments. In some embodiments, the system can be operatively coupled to the computer system 210 shown in FIG. 9 or the computer system 210 can comprise the system. In some embodiments, the computer system 210 can include and/or operate and/or process computer-executable code of one or more of the above-mentioned program logic, software modules, and/or systems. Further, in some embodiments, the computer system 210 can operate and/or display information within one or more graphical user interfaces coupled to the system. In some embodiments, the computer system 210 can comprise a cloud server and/or can be coupled to one or more cloud-based server systems.

In some embodiments, the system 210 can comprise at least one computing device including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 234. Further, in some embodiments, the interfaces 235a, 235b coupled to at least one processor 232 can be configured to process one or more of the software modules 238 (e.g., such as enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that the invention can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on computer-readable storage media within the system 210 and on computer-readable storage media coupled to the system 210. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments of the invention, the system 210 can comprise at least one computer readable medium 236 coupled to at least one data source 237a, and/or at least one data storage device 237b, and/or at least one input/output device 237c. In some embodiments, the invention can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, the computer readable medium 236 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 236 can transmit or carry instructions to a computer 240 and/or at least one user 231, including a router, private or public network, or other transmission device or channel, both wired and wireless. In some embodiments, the software modules 238 can be configured to send and receive data from a database (e.g., from a computer readable medium 236 including data sources 237a and data storage 237b that can comprise a database), and data can be received by the software modules 238 from at least one other source. In some embodiments, at least one of the software modules 238 can be configured within the system to output data to at least one user 231 via at least one graphical user interface rendered on at least one digital display.

In some embodiments of the invention, the computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include personal computers 240a coupled through the LAN 239a that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some further embodiments, the user 231 can comprise a mobile user 231b coupled to the system 210. In some embodiments, the user 231b can use any mobile computing device 231c to wireless coupled to the system 210, including, but not limited to, personal digital assistants, and/or cellular phones, mobile phones, or smart phones, and/or pagers, and/or digital tablets, and/or fixed or mobile internet appliances.

The subject matter described herein are directed to technological improvements to the field of artificial intelligence by proving artificial intelligence driven industrial reference recognition software that takes less computing resources to train and execute. The disclosure describes the specifics of how a machine including one or more computers comprising one or more processors and one or more non-transitory computer implement the system and its improvements over the prior art. The instructions executed by the machine cannot be performed in the human mind or derived by a human using a pin and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide a technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the additional meaning to the following terms:

"Substantially" and "approximately" when used in conjunction with a value encompass a difference of 5% or less of the same unit and/or scale of that being measured. In some embodiments, "substantially" and "approximately" are defined as presented in the specification in accordance with some embodiments.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

The use of and/or, in terms of "A and/or B," means one option could be "A and B" and another option could be "A or B." Such an interpretation is consistent with the USPTO Patent Trial and Appeals Board ruling in ex parte Gross, where the Board established that "and/or" means element A alone, element B alone, or elements A and B together.

As used herein, some embodiments recited with term "can" or "may" or derivations there of (e.g., the system display can show X) is for descriptive purposes only and is understood to be synonymous with "configured to" (e.g., the system display is configured to show X) for defining the metes and bounds of the system The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless a explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An industrial image recognition system comprising:
one or more computers comprising one or more processors and one or more non-transitory computer readable media, the one or more non-transitory computer readable media comprising instructions stored thereon that when executed cause the one or more computers to:
by the one or more processors, import one or more industrial references,
by the one or more processors, identify one or more industrial images associated with the one or more industrial references,
by the one or more processors, identify one or more industrial characters associated with the one or more industrial references,
by the one or more processors, return an image location of each of the one or more industrial images, and
by the one or more processors, return a character location of each of the one or more characters.

2. The industrial image recognition system of claim 1,
the one or more non-transitory computer readable media comprising further instructions stored thereon that when executed cause the one or more computers to:
by the one or more processors, implement artificial intelligence to identify the one or more industrial images associated with the one or more industrial references.

3. The industrial image recognition system of claim 1,
the one or more non-transitory computer readable media comprising further instructions stored thereon that when executed cause the one or more computers to:
by the one or more processors implement artificial intelligence to identify the one or more characters associated with the one or more industrial references.

4. The industrial image recognition system of claim 3, wherein each of the one or more characters comprises a letter, a number, and/or a text symbol.

5. The industrial image recognition system of claim 3, wherein the one or more characters comprises a string of characters.

6. The industrial image recognition system of claim 5, wherein each of the string of characters is one or more of a letter, a number, or text symbol.

7. A system for training artificial intelligence to recognize industrial images and/or industrial text characters comprising:
one or more computers comprising one or more processors and one or more non-transitory computer readable media, the one or more non-transitory computer readable media comprising instructions stored thereon that when executed cause the one or more computers to:
by the one or more processors, import an industrial image,
by the one or more processors, identify one or more characters in an industrial reference,
by the one or more processors, return a location of the one or more characters,
by the one or more processors, store the location of the one or more characters in a database,
by the one or more processors, remove the one or more characters in the industrial reference,
by the one or more processors, return the industrial reference with the one or more characters removed as a modified industrial reference.

8. The system for training artificial intelligence of claim 7,
wherein the industrial reference includes a combination of industrial characters and industrial text.

9. The system for training artificial intelligence of claim 8,
the one or more non-transitory computer readable media comprising further instructions stored thereon that when executed cause the one or more computers to:
by the one or more processors, import one or more clipped industrial images from the modified industrial reference.

10. The system for training artificial intelligence of claim 9,
the one or more non-transitory computer readable media comprising further instructions stored thereon that when executed cause the one or more computers to:
by the one or more processors, implement an artificial intelligence, and
by the one or more processors, send the one or more clipped industrial images to the artificial intelligence as a training set.

11. The system for training artificial intelligence of claim 9,
the one or more non-transitory computer readable media comprising further instructions stored thereon that when executed cause the one or more computers to:
by the one or more processors, rotate each of the one or more clipped industrial images,
by the one or more processors, implement an artificial intelligence, and
by the one or more processors, send the one or more rotated clipped industrial images to the artificial intelligence as a training set.

12. The system for training artificial intelligence of claim 8,
the one or more non-transitory computer readable media comprising further instructions stored thereon that when executed cause the one or more computers to:
by the one or more processors, import one or more clipped industrial images from the modified industrial reference,
by the one or more processors, create plurality of copies of each of the one or more clipped industrial images, by the one or more processors, rotate each of the plurality of copies to create a plurality of rotated copies, by the one or more processors, implement an artificial intelligence, and by the one or more processors, send the one or more clipped industrial images and the plurality of rotated copies to the artificial intelligence as a training set.

13. A method for training artificial intelligence to recognize industrial images and/or industrial text characters, the method comprising the steps of:

providing one or more computers comprising one or more processors and one or more non-transitory computer readable media, the one or more non-transitory computer readable media comprising instructions stored thereon that when executed cause the one or more computers to:

providing an industrial reference;

by the one or more processors, implement an artificial intelligence;

creating one or more clipped industrial images from the industrial reference;

by the one or more processors, sending the one or more clipped industrial images to the artificial intelligence as a training set.

14. The method for training artificial intelligence of claim 13, further comprising the step of:

removing all text from the industrial reference to create a modified industrial reference, wherein the clipped industrial images are created from the modified industrial reference.

15. The method for training artificial intelligence of claim 13, further comprising the steps of:

removing all characters from the industrial reference to create a modified industrial reference, wherein the clipped industrial images are created from the modified industrial reference; and creating a plurality of copies of each of the one or more clipped industrial images, rotating each of the plurality of copies to create a plurality of rotated copies, and by the one or more processors, sending the one or more clipped industrial images and the plurality of rotated copies to the artificial intelligence as a training set.

16. The method for training artificial intelligence of claim 13, further comprising the steps of:

by the one or more processors, identifying a location of one or more characters within the industrial reference, by the one or more processors, storing a location of one or more characters within a database, and by the one or more processors, sending the industrial reference to the artificial intelligence to determine a hit rate of the industrial images in the industrial reference.

17. The method for training artificial intelligence of claim 16, further comprising the steps of:

providing a character set, by the one or more processors, sending the character set to train the artificial intelligence to recognize characters within the industrial reference.

18. The method for training artificial intelligence of claim 17, wherein the industrial reference includes one or more of piping and instrumentation diagrams, electrical plans, power plant diagrams, electronic circuit diagrams, block diagrams, logic diagrams, HVAC diagrams, process flows, welding and wiring diagrams, flow charts, class diagrams, and transition and timing diagrams.

* * * * *